United States Patent Office 3,518,293
Patented June 30, 1970

3,518,293
PROCESS FOR THE PREPARATION OF
TRIFLUOROMETHYL ISOCYANATE
Erich Klauke, Cologne-Flittard, and Hans Holtschmidt, Leverkusen-Steinbuchel, Germany, assignors to Farbenfabriken Bayer Aktiengesellschaft, Leverkusen, Germany, a corporation of Germany
No Drawing. Filed May 10, 1967, Ser. No. 637,365
Claims priority, application Germany, May 11, 1966, F 49,175
Int. Cl. C07c 53/00, 119/04; D06m 13/34
U.S. Cl. 260—453                  5 Claims

ABSTRACT OF THE DISCLOSURE

Trifluoromethyl isocyanate is prepared by reacting anhydrous hydrogen fluoride with chlorocarbonyl isocyanide dichloride.

---

This invention relates to the production of trifluoromethyl isocyanate.

Trifluoromethyl isocyanate is an old compound. It has many advantageous properties including use as a valuable intermediate in the production of insecticides as well as in the production of fluorinated amides and the like. Trifluoromethyl isocyanate has been prepared heretofore by the Curtius reaction with a perfluoroacyl halide by controlled hydrolysis of perfluoro (methylene methylamine) or reaction thereof with silica at 160 to 200° C. and by reacting carbonyl difluoride with certain metal cyanides, halogen cyanides or organic cyanides such as sodium cyanide, cyanogen bromide or acetonitrile. In spite of all of these methods of preparation, full realization of the advantageous properties of trifluoromethyl isocyanate has not been possible because none of the heretofore known methods are suitable for economical production of this compound. The carbonyl fluoride route, i.e. by reaction with alkali metal cyanides and the like requires a temperature of at least 200° C. and the reaction really does not proceed well below about 500° C. This high temperature, not to mention the nature of the starting materials, is enough to render it unsuitable for commercial use.

It is therefore an object of this invention to provide an improved process for the production of trifluoromethane isocyanate. Another object of this invention is to provide a process for the preparation of trifluoromethyl isocyanate in an improved yield. Still another object of the invention is the preparation of trifluoromethane isocyanate at a lower temperature and with easy separation of the trifluoromethyl isocyanate from the excess of starting material. A further object of the invention is to provide a process for the preparation of trifluoromethyl isocyanate which does not require the use of an additional solvent.

The foregoing objects and others are accomplished in accordance with the invention, generally speaking, by providing for the reaction of anhydrous hydrogen fluoride with N-chlorocarbonyl isocyanide dichloride,

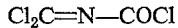

to prepare trifluoromethyl isocyanate. This is a technically simple method which can be carried out at low temperatures with good yields employing relatively inexpensive equipment. Furthermore, the starting materials are readily available. Anhydrous hydrogen fluoride is a tonnage chemical, N-chlorocarbonyl isocyanide dichloride is readily available from methyl isocyanate and chlorine, both of which are already available in commercial quantities. The chlorocarbonylisocyanide dichloride starting material can be obtained, for example, by chlorination of methyl isocyanate according to the method disclosed in Angewandte Chemie, vol. 74, page 849 (1962).

The reaction can be diagrammed according to the following equation:

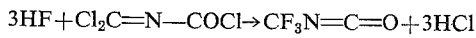

It is preferred to carry the reaction out with anhydrous hydrogen fluoride at a temperature below the boiling point of hydrogen fluoride, i.e. below about 20° C. Low temperatures do not seem to affect the course of the reaction and, consequently, the reaction can be carried out at temperatures of −50° C. up to +20° C. and if pressure is employed in order to keep the anhydrous hydrogen fluoride in the liquid state temperatures up to +75° C. can be used. It is preferred, however, to operate at temperatures in the range of −25° C. to +50° C. and best results are obtained in temperatures around 0° C., i.e. from −10° C. to about +10° C. Thus, in accordance with the preferred embodiment of the invention the reaction is carried out by introducing the components at low temperatures, i.e. about 0° C. into a vessel made of a material which is inert to the reaction component and preferably a metal vessel such as nickel, copper, platinum, a nickel-iron-molybdenum alloy or the like. It is best to provide the reaction vessel with a reflux cooler in order to return any gaseous hydrogen fluoride to the reaction vessel. If the reaction is carried out at a temperature above the boiling point of the anhydrous hydrogen fluoride it is necessary to place the reactants under pressure sufficient to keep the hydrogen chloride in the liquid state.

The proportions of components are important to the invention since at least 3 mols of anhydrous hydrogen fluoride must be present for each mol of starting N-chlorocarbonyl isocyanide dichloride in order to have the reaction go to completion. It is preferred to use a substantial excess of hydrogen fluoride but not so much that a great deal of it has to be decomposed after the reaction is complete provided it is carried out in a batch process. Of course, the reaction can be carried out continuously or in a batch process by conducting the reactants through a suitable reaction zone and continuously withdrawing the product and any excess hydrogen fluoride. The sequence in which the components are combined has no material effect on the course of the reaction nor are the temperature conditions set forth above very important to the success of the reaction although they may be very important to the success of a commercial operation.

It is possible to carry the reaction out in an inert organic solvent such as diethyl ether, dioxane, methylene chloride, chloroform, benzene, chlorobenzene, nitrobenzene or the like, it is also possible and preferred to use an excess of hydrofluoric acid as the solvent and to add an inert organic solvent of the type disclosed above after the reaction is terminated in order to take up the trifluoromethyl isocyanate and carry the excess hydrogen chloride into solution so that it is bound up and the gaseous trifluoromethyl isocyanate can be easily recovered. An excess of hydrogen fluoride in the range of more than 3 mols of hydrogen fluoride up to about 10 mols of hydrogen fluoride per mol of chlorocarbonyl isocyanide dichloride is preferred. After the reaction is complete as evidenced by the disappearance of the N-chlorocarbonyl carbonylisocyanide dichloride, the excess hydrogen fluoride can be bound up with, for example, sodium fluoride so that it can be separated more easily from the trifluoromethyl isocyanate. The trifluoromethyl isocyanate is a gas which distills out of a reaction mixture at temperatures above −38 to −35° C. In most cases the isocyanate can be used directly in the form in which it is recovered or if it is prepared in an inert solvent listed above then it can be used in the form of this solution for further reaction. If it is in solution it can be isolated therefrom by simply heating the mixture in order to recover the isocyanate. Trifluoromethyl isocyanate is useful as a laundry fast, water repellent finish for cellulose fabrics as disclosed in U.S. Pat. 3,118,923.

The invention is further illustrated by the following example in which the parts are by weight unless otherwise indicated.

EXAMPLE

About 50 g. chlorocarbonyl isocyanide dichloride (B.P. 12 mm.: 24°; $n_D^{20}$: 1.4796) are placed into a reaction vessel of nickel equipped with stirrer, thermometer and reflux cooler which has been cooled to a very low temperature. About 50 ml. of anhydrous hydrofluoric acid are added in the course of about 15 minutes at an internal temperature of about 0° C. When all the hydrofluoric acid has been added, the reaction is left to continue while stirring is continued and the temperature slowly rises to 18 to 20° C. Evolution of HCl, which initially is rapid, is practically complete after about 3 hours. The reaction mixture is covered with a layer of 250 ml. o-dichlorobenzene and cooled to about 0 to 5° C. and 40 g. sodium fluoride are added. The organic solution is decanted from the salt precipitant. This solution of trifluoromethyl isocyanate can be used directly for further reactions or alternately the pure trifluoromethyl isocyanate may be distilled off by heating. Trifluoromethyl isocyanate is a gas which distills over at between −38 and −35° C. The yield of distilled trifluoromethyl isocyanate is 27 g. (78 percent of theoretical).

It is to be understood that the foregoing example is given for the purpose of illustration and that any other suitable solvent, set of reaction conditions or the like could be used therein provided that the teachings of this disclosure are followed.

Although the invention has been described in considerable detail for the purpose of illustration, it is to be understood that variations can be made therein by those skilled in the art without departing from the spirit of the invention and the scope of the claims.

What is claimed is:
1. A process for the preparation of trifluoromethyl isocyanate which comprises reacting N-chlorocarbonyl isocyanide dichloride with anhydrous hydrogen fluoride in the molar ratio of at least 3 mols of hydrogen fluoride per mol of N-chlorocarbonyl isocyanide dichloride.
2. The process of claim 1 wherein said reaction is carried out at a temperature of −50° C. to +75° C.
3. The process of claim 1 wherein said reaction is carried out at a temperature of −25° C. to 20° C.
4. The process of claim 1 wherein said reaction is carried out in an inert organic solvent.
5. The process of claim 1 wherein an excess of said hydrogen fluoride is used and then reacted with sodium fluoride when the trifluoromethyl isocyanate has been formed.

References Cited
UNITED STATES PATENTS

| | | | |
|---|---|---|---|
| 2,617,817 | 11/1952 | Ahlbrecht et al. | 260—453 |
| 3,052,723 | 9/1962 | Tullock | 260—453 XR |
| 3,118,923 | 1/1964 | Fawcett et al. | 260—453 |

CHARLES B. PARKER, Primary Examiner

D. H. TORRENCE, Assistant Examiner

U.S. Cl. X.R.

260—465.1, 544, 557, 999; 8—116.2